United States Patent [19]

Ferrari et al.

[11] Patent Number: 4,683,476
[45] Date of Patent: Jul. 28, 1987

[54] DRAWING MACHINE HAVING AUTOMATICALLY REPLACED WRITING MEMBERS AND APPARATUS THEREFOR

[75] Inventors: Alphonse Ferrari, Vincennes; Michel Roche, Courtry; Jean-Claude Dard, Villemomble, all of France

[73] Assignee: Benson S.A., Creteil, France

[21] Appl. No.: 744,353

[22] Filed: Jun. 13, 1985

[30] Foreign Application Priority Data

Jun. 22, 1984 [FR] France .................................. 84 09829
Oct. 29, 1984 [FR] France .................................. 84 16500

[51] Int. Cl.4 .......................... G01D 9/00; G01D 9/28; G01D 15/16
[52] U.S. Cl. ........................................ 346/29; 346/46; 346/49; 346/139 R
[58] Field of Search .................. 346/139 R, 140 R, 27, 346/46, 49, 139 A, 139 B, 139 C, 139 D, 141

[56] References Cited

U.S. PATENT DOCUMENTS

| | | | |
|---|---|---|---|
| 2,717,820 | 9/1955 | Bowditch | 346/140 |
| 2,936,207 | 5/1960 | Beaumont | 346/29 |
| 3,543,279 | 11/1970 | Rempel | 346/141 |
| 3,753,384 | 8/1973 | Anfindsen | 90/24 R |
| 3,883,879 | 5/1975 | Kettering | 346/33 |
| 4,106,031 | 8/1978 | Jozat | 346/140 |
| 4,157,552 | 6/1979 | Nakajima | 346/141 |
| 4,165,513 | 8/1979 | Flory | 346/141 |
| 4,173,021 | 10/1979 | Zuchner et al. | 346/140 |
| 4,299,031 | 11/1981 | Collins | 33/18 R |
| 4,401,996 | 8/1983 | Shirahata | 346/139 R |

FOREIGN PATENT DOCUMENTS 2934273 12/1981 Fed. Rep. of Germany .
2082510 3/1982 United Kingdom .

Primary Examiner—E. A. Goldberg
Assistant Examiner—Mark Reinhart
Attorney, Agent, or Firm—Ladas & Parry

[57] ABSTRACT

The body of a writing member is movable in translation between a rest position and a work position, at least partly under the action of a magnetic force, and is permanently held against at least one guide element carried by the support, by means of a magnetic attraction force acting transversely relative to the direction of displacement in translation of the writing member.

27 Claims, 6 Drawing Figures

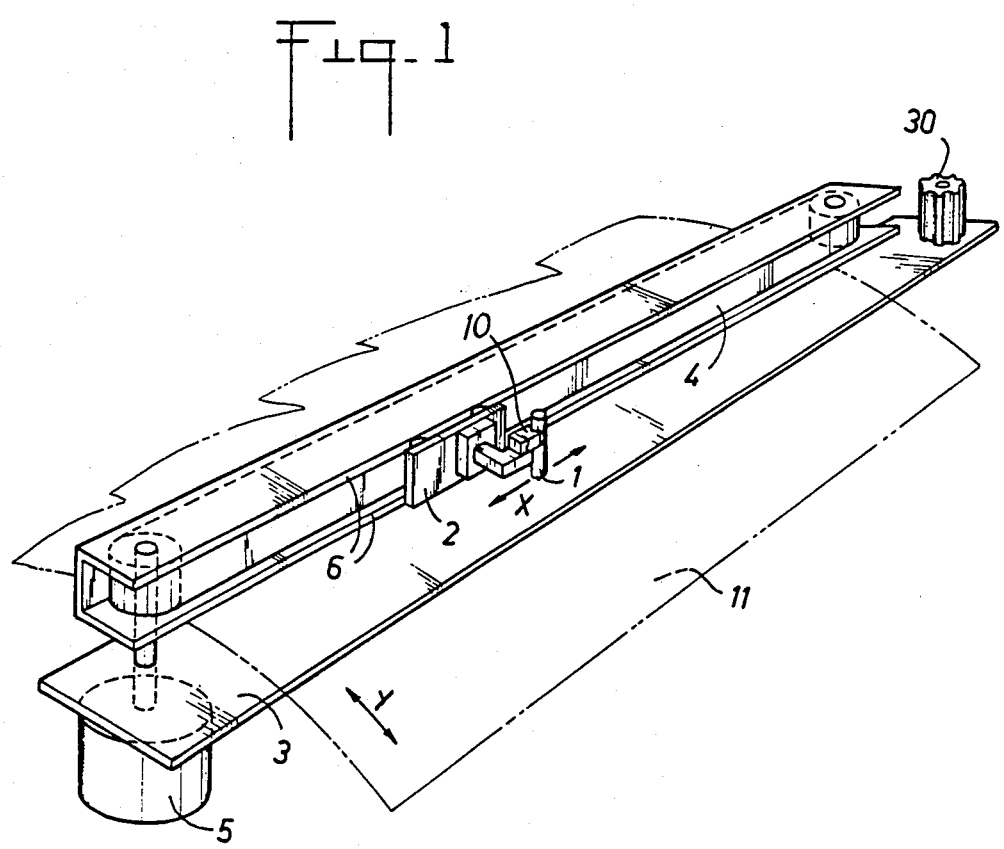

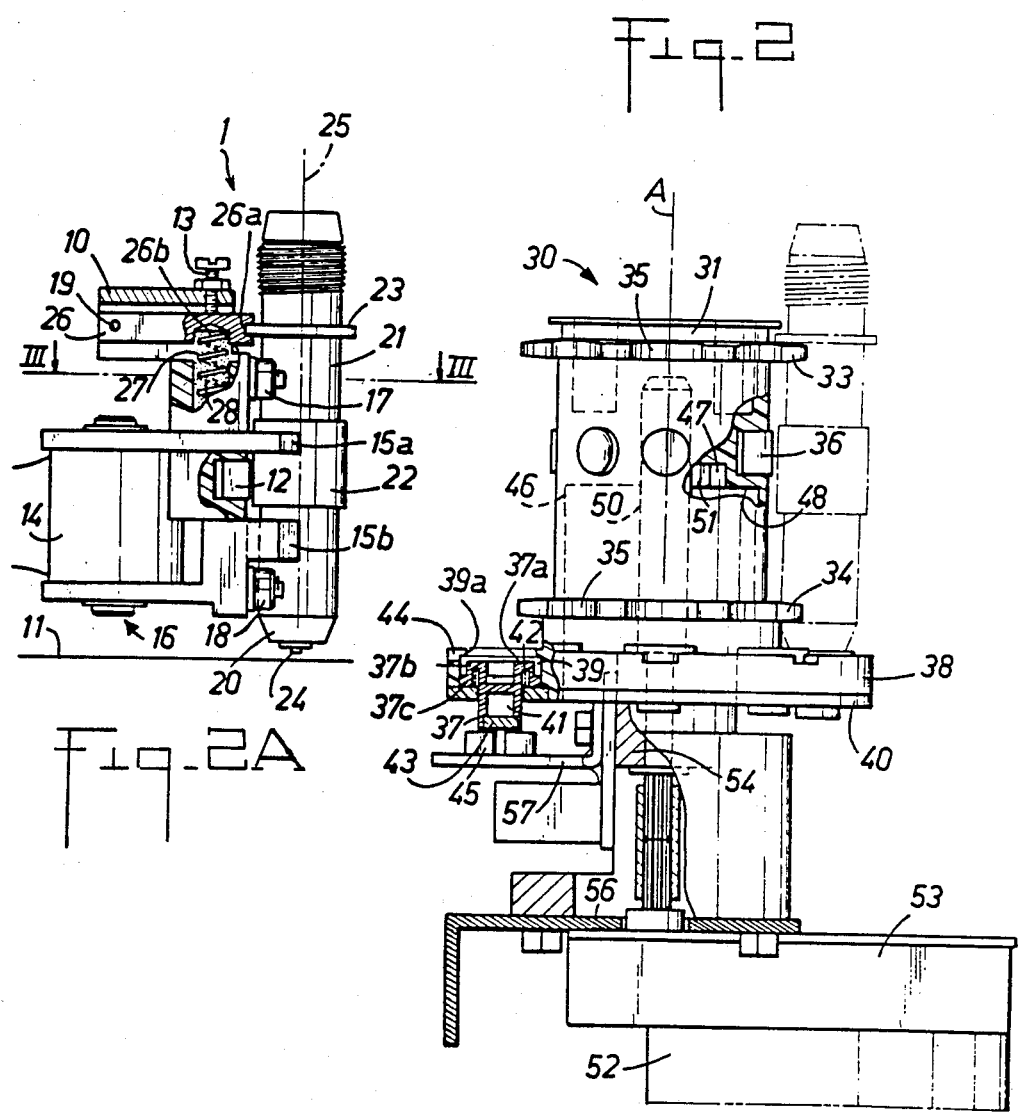
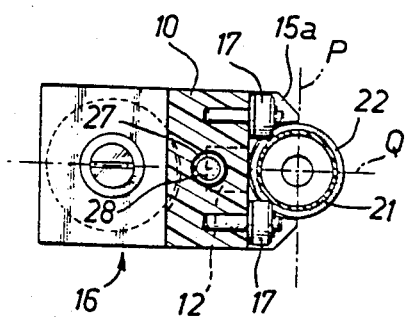

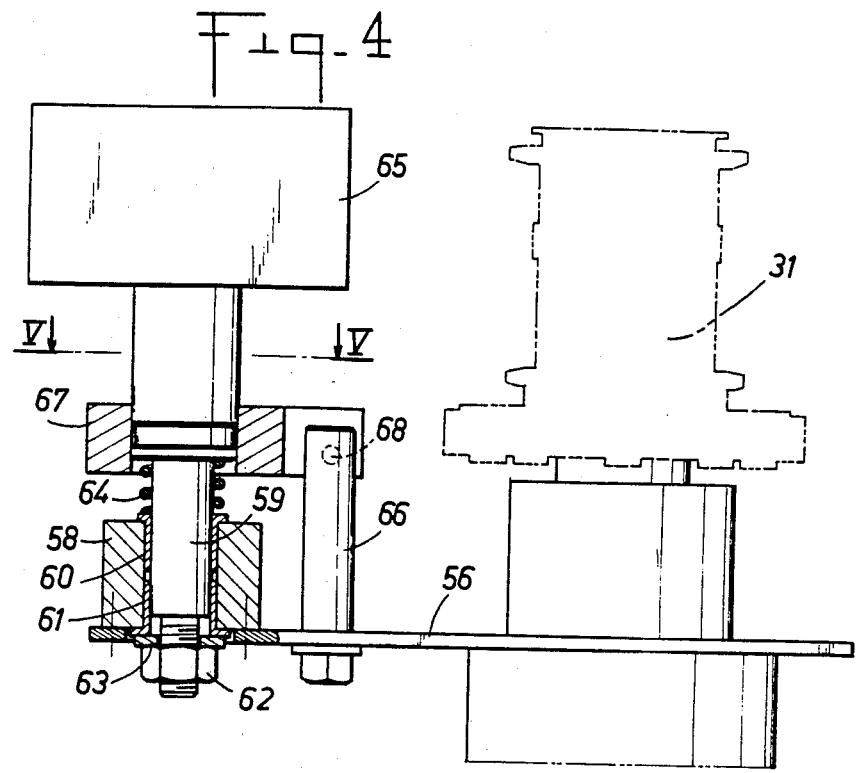
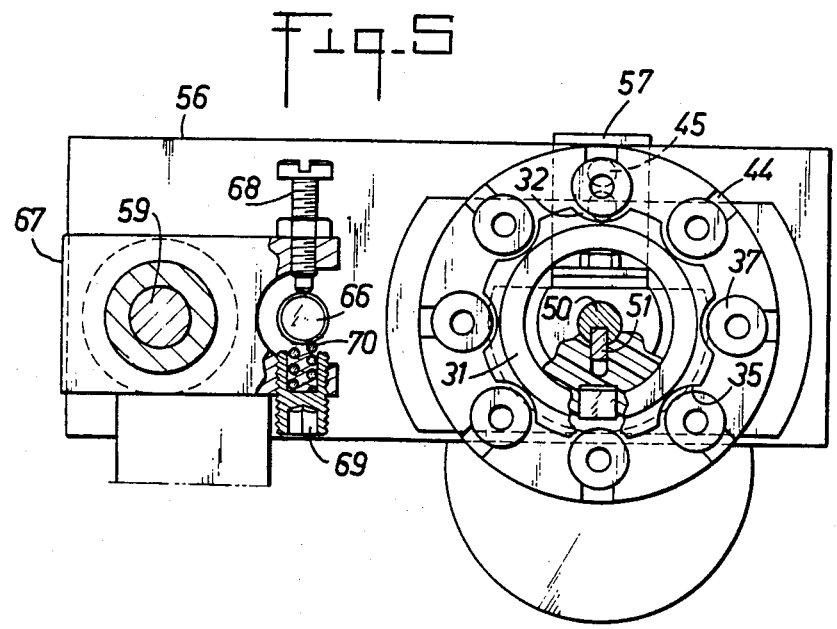

DRAWING MACHINE HAVING AUTOMATICALLY REPLACED WRITING MEMBERS AND APPARATUS THEREFOR

FIELD OF THE INVENTION

The present invention relates to a writing device for a drawing machine and more particularly to a write head for carrying a writing member such as a pencil, a pen or the like. The invention also relates to a writing device comprising a write head and a magazine for storing a plurality of writing members to selectively replace the writing member of the write head.

DISCUSSION OF THE TECHNICAL PROBLEM

Writing devices are known in which the write head is movable relative to a print medium which is itself movable in a direction perpendicular to the displacement direction of the head. The writing member can be changed by bringing the write head to an end of its stroke which is in the vicinity of a magazine or revolving cylinder including housings in which a plurality of writing members are stored. Transfer means are designed for automatically transferring a writing member from the write head to a free housing in the magazine and, inversely, for transferring a writing member from a housing in the magazine to the write head.

The write head typically comprises a support for receiving a writing member directed towards the print medium along a longitudinal direction. Generally the writing head is movable between a rest (raised) position and a work (lowered) position used for drawing lines on the print medium.

The drawing of fast and accurate lines by means of drawing machines requires firstly rapid movement of the writing member between its rest (raised) position and work (lowered) position, and secondly accurate guiding of the writing member, at least when it is in the lowered position.

It is well known to use electromagnetic means for controlling the displacement of the writing member between its raised and lowered positions. In order to reduce to a minimum the mass which moves during these displacements, proposals have been made to make write heads in which only the writing member is displaced. A device of this type is described in U.S. Pat. No. 4,299,031. In this known device, the body of the writing member carries a metal part which co-operates with a permanent magnet and with an electromagnet, which magnets serve respectively to raise and to lower the writing member. The body of the writing member is guided inside a tubular part. It is necessary for this guidance to be provided with minimum play in order to bring the writing member into its work position with the desired accuracy. However, the friction between the body of the writing member and the tubular part can then be such as to oppose the movement of the writing member between its raised and lowered position and can thus impede proper operation of the head.

In order to provide effective guidance without running into friction problems, German Pat. No. 3,217,755 proposes mounting the writing member on a carriage having wheels which are mounted relative to guide rods in such a manner as to prevent any relative movement between the writing member and said rods other than movement parallel to the rods. The proposed assembly is a relatively complex and the problem posed by displacing a rather large mass reappears. Further, and this is true of the previous case as well, the assembly does not lend itself easily to automatically changing the writing member.

SUMMARY OF THE INVENTION

An object of the present invention is to provide a write head of very simple structure and capable both of fast and of accurate drawings.

More particularly, the invention aims to provide a write head in which the mass to be displaced to move the writing member from its rest position to its work, or vice versa, is minimal, while still ensuring very accurate guidance of the writing member when it is brought to its work position.

Another object of the invention is to provide a write head which lends itself easily to automatically changing the writing member.

A further object of the present invention is to provide a writing device in which both the transfer means and the structure of the write head and of the magazine are considerably simplified compared to existing device.

According to a first aspect of the invention, a write head for a drawing machine comprises: a support adapted to receive a writing member directed along longitudinal direction towards a print medium, said support including a side portion opened towards a first lateral direction substantially perpendicular to said longitudinal direction; positioning means on the side portion of said support for laterally positioning said writing member when said writing member engages said positioning means; and holding means on said support for applying a magnetic attraction force to said writing member, said force acting on said writing member in a direction opposite said first lateral direction to urge said writing member in engagement with said positioning means, said writing member being separable from the support by pulling said writing member away from said support against said magnetic attraction force.

For use with a movable pen, the positioning means comprises guiding means for laterally positioning said writing member while permitting movement thereof in the longitudinal direction, and the write head further comprises selectively controlled driving means for moving said writing member in the longitudinal direction between a rest position and a work position engaging said print medium.

Each guide element is made in such a manner as to reduce to a minimum the friction between the guide element and the body of the writing member. Preferably, the guide elements are constituted by rolling elements, such as balls or wheels carried by the support and rolling over the writing member when it is displaced in the longitudinal direction.

Advantageously, a damping device is interposed between the support and the writing member for damping the writing member in the longitudinal directions, in particular to avoid bounce of the end of the writing member in the work position.

According to another aspect of the invention, a writing device for a drawing machine comprises: a write head comprising a support having a laterally opened side portion; positioning means on the side portion of said support for laterally positioning a writing member having a longitudinal direction when said writing member engages said positioning means; first holding means on said support for applying a first magnetic attraction force to said writing member to laterally urge said writing member in engagement with said positioning means; magazine for storing a plurality of writing members comprising a plurality of laterally opened housings each having abutting surfaces to be engaged by a respective writing member; second holding means on said magazine for applying a second magnetic attraction force to each of said plurality of writing members to hold said writing members in engagement with said abutting surfaces; and transfer means for temporarily varying at least one of said first and second magnetic attraction forces to change the resultant of said magnetic attraction forces between a positive value able to transfer a writing member from the write head to the magazine, and a negative value able to transfer a writing member from the magazine to the write head.

Advantageously, each of said writing members comprises a magnetic element, said second holding means comprises means for applying a permanent second magnetic attraction force to said magnetic elements; and said first holding means comprises means for applying said first magnetic attraction force to the magnetic element of an adjacent writing member, said first attraction force being varied, under the control of said transfer means, between a first value lower than said second attraction force and a second value higher than said second attraction force.

BRIEF DESCRIPTION OF THE DRAWINGS

Other features and advantages of a writing device in accordance with the invention appear from the following description given by way of non-limiting example with reference to the accompanying drawings in which:

FIG. 1 is a view of a portion of a drawing machine fitted with a writing device in accordance with the invention;

FIG. 2 is a front view and an elevation view showing a write head and a magazine of a writing device in accordance with the invention.

FIG. 3 is a section through the write head on a plane III—III of FIG. 2;

FIG. 4 is a side elevation view showing how the magazine of the FIG. 2 device is mounted; and FIG. 5 is a section on a plane V—V of FIG. 4.

DETAILED DESCRIPTION OF PREFERRED EMBODIMENTS

FIG. 1 shows, in a highly diagrammatic manner, a portion of a drawing machine which comprises, in a manner known per se, a write head 1 mounted on a carriage 2 and a surface 3 for supporting and guiding a drawing medium such as a sheet 11.

The sheet 11 is moved longitudinally along an X direction by friction or tractor drive means (not shown). The write head is movable in translation in a transverse horizontonal direction Y which is perpendicular to the direction X. To this end, the carriage 2 is fixed to an endless band or chain 4 which is driven by a motor 5. During its displacement, the carriage 2 is guided by a slideway 6.

A rotary magazine 30 is mounted at one end of the stroke of the write head for the purpose of automatically changing the writing member carried by the head.

Reference is now made to FIGS. 2 and 3 which show in greater detail one embodiment of a write head 1 constituting a part of a writing device in accordance with the invention.

This head 1 comprises a support 10 carrying a writing member 20. This member (a pencil, pen or the like) is shown in dot-dashed lines in Figure 2 and is mounted in a cylindrical body 21 with the end of the writing member having the writing point 24 projecting below the bottom portion of the body 21. The body 21 is made of non-magnetic material and has a metal ring 22 of magnetic material. The upper portion of the body 21 above the ring 22, has an annular shoulder or collar 23. The assembly constituted by the writing member 20, the body 21, the ring 22, and the collar 23 is circularly symmetrical about an axis 25.

An electromagnet 16 comprising a winding 14 having an axis parallel to the body 21 and two pole pieces 15a, 15b is fixed to the support so that when the winding 14 is powered the writing member is brought to a work position against a return force exerted by a magnet 12 described below. The end portions of the pole pieces 15a and 15b are shaped to substantially embrace the contour of the ring 22 over a portion of its periphery lying on the same side of a plane P passing through the axis of the writing member. The pole pieces 15a and 15b are offset downwardly relative to the ring 22 to attract the body 21 downwardly with a substantially constant force. The force with which the point 24 of the writing member pressed against the sheet 11 is adjustable by moving the ring 22 longitudinally along the body 21 and/or by adjusting the current feeding the winding 14.

The body 21 is guided over the support 10 by means of two pairs of wheels 17 and 18 which are mounted free to rotate on the support and which are respectively situated above and below the electromagnet. In each pair, the wheels are situated on the same side of the plane P as are the pole pieces 15a and 15b and they are disposed symmetrically to one another about a plane Q passing through the axis of the writing member and perpendicular to the plane P (FIG. 3).

As shown in FIG. 3, the axes of the wheels 17, 18 are parallel to the plane Q and perpendicular to the axis 25 of the body 21, which body is in contact with the slightly chamfered outer edges of the wheels 17, 18.

The wheels 17, 18 guide the body 21 in translation relative to the support 10 and parallel to the axis between a rest or raised position (Figure 2) in which the point 24 is several mm above the sheet 11, and a work or lowered position in which the point 24 is pressed against the sheet 11.

In the rest position, the body 21 is held against the wheels 17, 18 by means of a sideways magnetic holding force exerted on the ring 22 by the permanent magnet 12 which is fixed to the support 10 between the pairs of wheels 17 and 18. The magnet 12 is situated at the same level as the ring 22 and exerts a force which is substantially perpendicular to the axis 25.

An armature 26 is hinged at one end to the support 10 about an axis 19 which is perpendicular to the axis 25, and at its other end it has a recess 26a in which the collar 23 of the body 21 is engaged as a fairly close fit, the recess 26a having a flared opening.

The armature 26 is permanently urged upwardly by a spring 27 having one end bearing against the support 10 and having its other end disposed in a housing 26b formed in the lower face of the armature 26. The upper position of the armature 26 is defined by its coming into contact with an adjustable stop 13 mounted on the support 10, while the lower position of the armature 26 is defined by its coming into contact with a stop surface of support 10.

The spring 27 is a helical spring and a cylinder 28 of deformable material, for example made of synthetic foam material, is disposed inside the spring.

It may be observed that the support and the above-described components fixed to the support 10 are all situated on the same side of the plane of symmetry P of the body 21. Also, the body 21 may be detached from the support 10 by pulling against the horizontal component of the force exerted by the magnet 12. The body 21 together with the writing member 20 and the ring 22 constitutes an assembly which is circularly symmetrical and suitable for being applied in any angular position against the wheels 17, 18 which are themselves arranged in a manner which is not circularly symmetrical.

It may also be observed that the descirbed assembly is capable, without special modifications, of using writing members having bodies of slightly different diameters.

The support 10 of the write head opens sideways towards the rotary magazine 30 which is now described in detail with reference to FIGS. 2, 4, and 5.

The magazine 30 essentially comprises a support part 31, or cylinder, having plurality of identical housings 32 in its periphery for writing members.

The cyclinder comprises a cylindrical body having a vertical axis A and two collars 33 and 34 which are respectively situated at the upper portion and at the lower portion of the cylinder and which have notches 35 in their peripheries, with the notches being the form of circular arcs which are regularly distributed around the axis A. Two vertically aligned notches 35 define a housings 32 for the body of a writing member. In the example shown, the housings 32 are eight in number and are regularly distributed around the cylinder.

As shown in FIG. 5, each notch 35 extends over an arc which is less than 180° such that the housings 32 are radially accessible.

The body of the cylinder 31 includes as many permanent magnets 36 as there are housings 32, each magnet being situated at the periphery of the cylinder adjacent to the central portion of a corresponding housing 32.

Thus, a magnet 36 co-operates with the metal ring 22 on the body of a writing member in order to hold the writing member in the housing 32, with the body of the writing member being pressed sideways against the cradle constituted by the notches 35 which define the housing.

Broken lines in FIG. 2 show the body of a writing member carried in the magazine 30. As can be seen in this figure, the magnet 36 is level with the ring 22 while the collar 23 on the body of the writing member is situated above the upper collar 33 of the cylinder 31.

The bottom of the cylinder 30 includes a plurality of caps 37, each of which is vertically aligned with a corresponding housing 32. The caps 37 are intended to protect the writing points of the writing members which are stored on the cylinder, and to close these points to prevent the ink from drying.

As shown in FIG. 2, the cylinder is fixed at its bottom end to an annular tray 38 having openings 39 which are aligned with the axes of the housings 32. Each opening passes through the entire thickness of the tray 38. A plate 40 is fixed under the tray 38 and has orifices 41 of smaller diameter than the openings 39, which orifices are aligned with the openings.

Each cap 37 has its opening pointing upwardly and is housed in a corresponding opening 39 and has a bottom cylindrical portion engaged through a corresponding orifice 41. At the top of each cap 37 there is a horizontal rim 37a which is downwardly extended by a vertical portion 37b which is itself terminated by an outer annular shoulder 37c. A spring 42 is mounted in the annular space having an upsidedown U-shaped section as delimited by the body of the cap and the rims 37a and 37b. A metal part 43 is fixed at the bottom end of the cap.

The cap 37 is vertically movable in the opening between a lower position (cap open) and an upper position (cap closed), and is guided by the shoulder 37c engaging the side wall of the opening.

When the rotary magazine is brought to an angular position such that a cap 37 is placed above a magnet 45 which is not fixed to the rotating magazine, the magnet exerts an attractive force on the metal part 43 causing the cap to move downwardly against the return force exerted by the spring 42. The lower position of the cap is defined by the shoulder 37c abutting against the plate 40 around the orifice 41 (FIG. 2).

Once the magazine has turned and the cap 37 is not subjected anymore to force from magnet 45, cap 37 is returned by spring 42 toward its closing position and abuts against the body of a writing member positioned in the respective housing 32. If there is no writing member, the upward displacement of the cap 37 is limited by the shoulder 37c abutting against a lower rim 39a surrounding the upper entrance to the opening 39.

The arrival of the cap 37 in its lower position enables sideways access to the corresponding housing 32. A radial groove 44 is formed in the upper surface of the tray 38 between each opening 39 and the outer edge of the tray in order to avoid damaging the writing point while a writing member is placed in the magazine or is removed therefrom by sideways displacement.

Except for the magnet 36 and the metal parts 43, the components constituting the magazine 30 described are made of non-magnetic material, e.g. plastics material.

The body of the cylinder 31 has a central passage 46 to enable the cylinder to be mounted on a vertical rotary rod 50. The rod 50 has a finger or clip 51 adjacent its top end for engaging in a corresponding radial housing 47 running from an internal shoulder 48 in a passage 46 (see FIG. 2). The finger 51 serves both to support the cylinder 31 of the rod 50 and also to fix the rod and cylinder in rotation.

The rod 50 is rotated by means of a motor 52 via stepdown gearing in a case 53. On its path between the stepdown gearing and the cylinder 31, the rod 50 is guided through a vertical bearing 54. This vertical bearing together with the motor 52 and the casing 53 are fixed on a support plate 56. A tab 57 is fixed to the bearing 54 and supports the magnet 45.

The support plate 56 is movable between two positions. In the present embodiment the axis of the cylinder remains parallel between these two extreme positions. As can be seen in FIGS. 4 and 5, the support plate 56 is pivotally mounted about a vertical axis which is offset from the axis of the rotary magazine. To this end, the support plate 56 is provided with a vertical bearing 58 having a fixed shaft 59 passing therethrough with interposed rings 60 and 61. The bottom end of the shaft 59 passes through the support plate 56 and is threaded to receive a nut 62 which, via a washer 63, connect the support plate 56 and all the components supported thereby to the fixed shaft 59.

The vertical position of the magazine 30 is adjusted by screwing the nut 62 more or less tightly. A spring 64 is interposed between the bearing 58 and a shoulder on the shaft 59 so as to contribute to holding the support plate 56 in the chosen position. Advantageously, the shaft 59 is fixed to a part 65 of the machine which supports the slideway for guiding the write head, the part 65 thus constituting a common reference for the positions of the write head and of the cylinder.

Pivoting of the support plate 56 is limited by a rod 66 fixed on the plate coming into contact with stops carried by a part 67 which is fixed to a shaft 59. The part 67 has a U-shaped end with the rod 66 being located between the branches thereof. One of these branches has a tapped hole in which a screw 68 is screwed such that its end defines a first stop which is adjustable in position. The other branch, the branch which is further from the write head, also has a tapped hole in which a hollow screw 69 is screwed having an end which defines a second stop which is adjustable in position. A spring 70 is lodged in the screw 69 and exerts a force on the rod 66 tending to urge the rod permanently against stop 68 and, thus, to urge the cylinder 31 towards the write head in a position in which it intercepts the write head to co-operate therewith adjacent to the end of the stroke thereof.

The operation of the writing device described above is as follows: We begin by considering only the operation of the write head. The writing member is moved from the rest position to the work position by passing a current through the winding 14. The horizontal component of the electromagnetic force exerted by the electromagnet 16 is added to the horizontal component of the force exerted by the magnet 12 to apply the body 21 against the wheels 17 and 18. Thus the body 21 is properly guided as it moves into the working position and is subsequently properly held in place in said working position as the writing member is moved.

The movement of the writing member into the work position takes place against the resilient return force exerted by the spring 27. The presence of this spring and of the block of deformable material 28 which fills the interior thereof serves to damp vertical oscillatory movements and thus avoids both writing point bounce as it is moved into the work position, and also writing point lift-off from the sheet 11 when the writing point encounters surface defects on the sheet 11 while writing thereon.

By way of example, if the writing member is moved to its work position without damping means, there is a period of about 10 to 15 ms between the moment at which the point of the writing member touches the sheet and the moment at which the point comes to rest in permanent contact with the sheet after bouncing. Interposing damping means such as those described above reduces this period to about 5 ms.

The writing member is returned to its rest position by interrupting the current through the winding 14, with the movement being provided by the resilient return force exerted by the spring 27.

The writing member is automatically changed as follows.

The writing member support 10 is open sideways in the direction of the magazine 30, i.e. the support is mounted on the carriage (FIG. 1) in such a manner that the plane Q (FIG. 3) is parallel to the direction of head displacement and encounters the cylinder 31 at the end of the head's stroke, with the points of the pole pieces 15a and 15b pointing in such a direction as to present a writing member 20 to the magazine 30. The cylinder 31 is rotatable so as to bring any one of the housings 32 into a transfer position in which it is exactly opposite to the support 10. This transfer position corresponds to the position of the tab 57 carried by the magnet 45.

To transfer a writing member carried by the write head to a free housing 32 situated in the transfer position, the write head conveys the writing member in its rest position to the magazine end of its stroke. The cap 37 of the housing 32 is in open (i.e. lowered) position under the effect of the magnet 45 such that the housing 32 is freely accessible sideways for the body of the writing member carried by the head. Each magnet 36 associated with a housing 32 is chosen so as to exert a magnetic attraction force which is greater than that exerted by the magnet 12 associated with the head. Thus, once the body of the writing member has arrived in the vicinity of the magnet 35 in the housing 32 in its transfer position, the magnet 36 causes the writing member to be extracted from the head and applies the writing member against the cradle 35.

The height of the cylinder 31 is adjusted so that the collar 23 on the writing member body comes just above the upper collar 33 of the cylinder.

Further, the rest position of the support plate 56 in abutment against the screw 68 is chosen in such a manner that the body of the writing member carried by the head comes into contact with the cylinder 31 and even displaces the support plate 56 against the spring 70 when the write head comes to the end of its stroke. This floating mount for the cylinder thus guarantees that the writing member carried by the head at the end of its stroke always comes into contact with the cradle 35 of the housing 32 in the transfer position, even if the symmetry in rotation of the cylinder is not perfect. Thus, it is guaranteed that the body of the writing member carried by the head at the end of its stroke is always close enough to the magnet 36 for the force of attraction which is exerted thereby to overcome the force of attraction exerted by the magnet 12. By way of example, the force exerted by the magnet 12 on a writing member carried by the head, and the force the exerted by a magnet 16 on a writing member situated in the corresponding housing 32 may respectively be equal to 75 and 150 g.

Now to transfer a new writing member to the head, the procedure is as follows:

After the head has moved back, the cylinder 31 is rotated until the housing 32 containing the selected new writing member has been brought to the transfer position. It should be observed that rotating the cylinder automatically closes the cap 37 associated with the writing member which has just been removed from the head and automatically opens the cap 37 associated with the newly selected writing member.

The head is returned to its end-of-stroke position against the body of the new writing member, with correct contact between the support 11 and the writing member being guaranteed by the floating mount of the cylinder. The winding 14 is then powered. The horizontal component of the electromagnetic force exerted by the electromagnet 16 is then added to the force exerted by the permanent magnet 12 to pull the writing member out from the housing 32 and to press it against the wheels 17 and 18.

Lowering of the writing member under the action of the vertical component of the force exerted by the electromagnet is prevented by contact between the collar 23 and the upper face of the collar 33.

The head is moved back and the power supply to the winding 14 is turned off prior to the collar 23 losing contact with the collar 33, but after the separation of the writing member from the cylinder is sufficient to ensure that the force exerted by the magnet 36 on the body of the writing member is less than the force exerted by the permanent magnet 12. By way of example, this separation may be chosen to be equal to about 2 or 3 mm, which means that the collars 23 and 33 must overlap by an amount which is at least equal thereto. Still by way of example, the horizontal attraction force exerted by the magnet 12 and electromagnet 16 acting in conjunction may be about 250 g.

For operation of the write head, the above description relies essentially on a resilient force for returning the writing to the rest position. However, in a variant, this return force may be exerted, at least partially, by a magnetic force. To this end, it suffices to place the magnet 12 in a position which is upwardly offset relative to the ring 22. The magnetic attraction force exerted by the magnet 12 on the ring 22 then has a horizontal component acting as a sideways holding force and a vertical component acting as a return force towards the rest position.

Still by way of a variant, the magnet 12 may be omitted from the FIG. 1 assembly if the ring 22 is magnetic. The sideways holding force (and optional return to rest position force) is then constituted by the force of attraction between the magnet ring and the pole pieces of the suitably polarized electromagnet. The writing member may be raised rapidly by reversing the direction of the current in the winding.

In the above description of changing the writing member, the horizontal component of the electromagnetic force used for controlling displacement of the writing member to its work position was used for the transfer from the magazine to the write head. In a variant, this transfer could be performed by establishing an electromagnetic force which is essentially horizontal and independent of the means used for moving the writing member into the work position.

In a more general manner, the present invention seeks to cover all cases where the writing member is held against the head or in the magazine housing by means of a magnetic force and where the transfer from the head to a housing in the magazine, or vice versa, is provided by the difference between the magnetic forces exerted on the body of the writing member.

We claim:

1. A marking head for a plotting machine, comprising:
    a support;
    a writing member having side walls and a marking tip at one end thereof,
    means for mounting said writing member for longitudinal movement on said support between a work position wherein the writing tip is operative for producing a mark on a writing medium placed opposite said support and a rest position further away from the writing medium, including;
    means on said support for engaging the side wall of said writing member when the same is urged toward said support, in a direction transverse to said longitudinal direction while allowing movement of said writing member relative to the support between said work and said rest positions; and
    holding means on said support and said writing member for producing a magnetic force for urging said side wall toward said support in said transverse direction and sufficient for holding said writing member at least in said rest position,
    said mounting means arranged to allow said writing member to be pulled away from said support in a direction generally opposite to said transverse direction in at least one position, and
    selectively controlled driving means for moving said writing member in the longitudinal direction from said rest to said work positions thereof.

2. A marking head according to claim 1 wherein said support includes a side portion laterally opened opposite said transverse direction, and said engaging means comprises rolling elements which are carried by said side portion of the support to roll over the sidewall of said writing member when the writing member is displaced in said longitudinal direction.

3. A marking head according to claim 2, wherein said writing member comprises a circular body symmetrical about said longitudinal direction, to be held in any angular position against said engaging means.

4. A marking head according to claim 2, wherein said writing member comprises a magnetic element and said holding means comprises a permanent magnet fixed to said support for applying said transverse magnetic force to said magnetic element.

5. The head of claim 1, wherein said driving means includes electromagnetic means for applying an electromagnetic force between said support and said writing member when said electromagnetic means is supplied with current, said electromagnetic force having one longitudinally directed component for driving said writing member from the rest position to the work position thereof and a component in said transverse direction which combines with the transverse magnetic force of said holding means to further urge said writing member against said support in the work position thereof.

6. A marking head according to claim 1, wherein said holding means is disposed on said marking head for applying a magnetic force component to said writing member to bias said writing member from the work position to the rest position thereof.

7. A write head according to claim 6, further comprising resilient means on said support for biasing said writing member from its work position to its rest position.

8. A marking head according to claim 1, further comprising damping means interposed between the support and the writing member for damping the displacements of said writing member in said longitudinal direction.

9. A marking head according to claim 8, wherein said damping means comprises a block of deformable material such as a foam lodged inside a helical spring for biasing the writing member to its rest position.

10. A write head according to claim 2, wherein said writing member comprises a permanent magnet, said driving means comprises an electromagnet carried by the support for applying a magnetic force to said permanent magnet, and said holding means comprises the armature of said electromagnet for urging said writing member in engagement with said guiding means by interaction with said permanent magnet.

11. A writing device for a drawing machine comprising:
    a write head comprising: a support having a laterally opened side portion; positioning means on the side portion of said support for laterally positioning a writing member having a longitudinal direction when said writing member engages said positioning means; first holding means on said support for applying a first magnetic attraction force to said writing member to laterally urge said writing member in engagement with said positioning means;

a magazine for storing a plurality of writing members comprising a plurality of laterally opened housings each having abutting surfaces to be engaged by a respective writing member; second holding means on said magazine for applying a second magnetic attraction force to each of said plurality of writing members to hold said writing members in engagement with said abutting surfaces; and transfer means for temporarily varying at least one of said first and second magnetic attraction forces to change the resultant of said magnetic attraction forces between a positive value able to transfer a writing member from the write head to the magazine, and a negative value able to transfer a writing member from the magazine to the write head.

12. A writing device according to claim 11, wherein each of said writing members comprises a magnetic element; said second holding means comprises means for applying a permanent second magnetic attraction force to said magnetic elements; and said first holding means comprises means for applying said first magnetic attraction force to the magnetic element of an adjacent writing member, said first attraction being varied, under the control of said transfer means, between a first value lower than said second attraction force and a second value higher than said second attraction force.

13. A writing device according to claim 12, wherein said first holding means comprises:

a permanent magnet located on said support for providing the first value of said first attraction force; and an electromagnet located on said support and controlled by said transfer means for temporarily providing, together with said permanent magnet, the second value of said first attraction force.

14. A writing device according to claim 13, wherein each housing of the magazine includes a first stop surface co-operating with a second stop surface disposed on each writing member to oppose longitudinal displacement thereof so long as the writing member has not been laterally moved a certain distance from its housing.

15. A writing device according to claim 14, wherein said second holding means comprises a plurality of permanent magnets located on said magazine, each of said permanent magnets being located adjacent a corresponding housing of said magazine for applying said second attraction force to a corresponding writing member.

16. A writing device according to claim 11, wherein said magazine comprises a body movably mounted on said drawing machine, said housing being located at the periphery of said body, said writing device further comprising driving means for moving said body to a plurality of positions, each position being such that a selected one of said housings is located in front of said guiding means of said write head before transferring a writing member to or from said selected housing.

17. A writing device according to claim 16, wherein the body of said magazine is rotatably mounted on a base disposed at one of the ends of the stroke of the write head and displaceable between two extreme positions, further comprising means for urging said base into one of said extreme positions where one selected housing is adjacent to the write head when transferring a writing member to or from said selected housing.

18. A writing device according to claim 17 wherein the body of said magazine comprises at least two series of regularly spaced arcuate notches disposed at the peripheries of said body, said notches comprising said abutting surfaces.

19. A writing device according to claim 11, wherein said magazine comprises a cap associated with each housing to protect and to close the writing end of a writing member mounted in the housing, said cap being movable from a closed position to an open position under the action of a magnet when the associated housing is located adjacent said write head, and being resiliently biased towards the closed position when the associated housing leaves said adjacent position.

20. The writing device according to claim 13 wherein said electromagnet applies a longitudinal electromagnetic force to said writing member to urge said member into a working position against a printing medium when said write head is apart from said magazine.

21. The head of claim 1, wherein said holding means comprises a magnetic element on one of said support and writing members and a permanent magnet on the other for producing said transverse magnetic force.

22. A marking head according to claim 5, further comprising means for adjusting the electromagnetic force acting on the writing member in the work position thereof to urge the same against the writing medium, said adjusting means comprising means for adjusting the current supplying said electromagnetic means.

23. The writing head of claim 5 wherein said holding means includes a magnetic element on said writing member and a permanent magnet fixed to said support, said magnetic element arranged to be responsive to said electromagnetic means for producing said electromagnetic force on said writing memeber.

24. The writing head of claim 23, further comprising means for adjusting the electromagnetic force acting on the writing member in the work position thereof to urge the same against the writing medium, said adjusting means comprising means for adjusting the position of said magnetic element on the writing member.

25. The writing head of claim 5, wherein said holding means includes a permanent magnet on said writing member, and said electromagnetic means is mounted on said support to produce said electromagnetic force on said permanent magnet and includes a yoke on said support mounted to interact with said permanent magnet to produce said transverse magnetic force on said writing member even in the absence of supply current.

26. A drawing machine write head comprising:

a support adapted to receive a writing member movably mounted on said support along a longitudinal direction;

guiding means on said support for laterally positioning said writing member while permitting movement thereof in the longitudinal direction when said writing member engages said guiding means;

holding means on said support for applying a magnetic attraction force to said writing member, said force acting on said writing member in a lateral direction substantially perpendicular to said longitudinal direction to urge said writing member in engagement with said guiding means;

a side portion of said support being laterally opened opposite said lateral direction, said guiding means being located on said side portion of the support so that said writing member is separable from the support by pulling said writing member away from said support against said magnetic attraction force;

selectively controlled driving means for moving said writing member in the longitudinal direction between a rest position and a work position engaging said print medium; and means interposed between the support and the writing member damping the displacements of said writing member in said longitudinal direction.

27. A write head according to claim 26, wherein said damping means comprises a block of deformable material such as a foam lodged inside a helical spring for biasing the writing member to its rest position.

* * * * *